United States Patent [19]
Faris

[11] Patent Number: 5,121,343
[45] Date of Patent: Jun. 9, 1992

[54] 3-D STEREO COMPUTER OUTPUT PRINTER

[76] Inventor: Sadeg M. Faris, 24 Pocantico River Rd., Pleasantville, N.Y. 10570

[21] Appl. No.: 554,742

[22] Filed: Jul. 19, 1990

[51] Int. Cl.$^5$ ............................................. G06K 15/00
[52] U.S. Cl. ..................................... 395/111; 250/558
[58] Field of Search ................... 364/518–521, 364/235 MS, 930 MS; 350/144, 370, 407, 130, 132; 352/60; 346/134, 135.1, 136; 250/558; 356/2

[56] References Cited
U.S. PATENT DOCUMENTS

| | | | |
|---|---|---|---|
| 2,623,433 | 12/1952 | Stipek | 350/132 |
| 3,659,939 | 5/1972 | Hobrough | 250/558 |

Primary Examiner—Arthur G. Evans

[57] ABSTRACT

A system for producing 3-D stereoscopic graphic hard copy output from computers is described. The left and right stereo images from the computer are spatially modulated, spatially multiplexed and then printed on a special paper. This special paper consists of a micropolarized sheet laminated to a polarization preserving reflective sheet. The spatially multiplexed stereo pair when printed on the micopolarizer and viewed with appropriatley polarized glasses, 3-D stereo images will result with full depth perception realized. The micropolarizer sheet seves as a spatial demultiplexer to separates the left and right images and codes them by means of two polarization states. The polarized spectacles serve as decoders and present to the left eye the left image and to the right eye the right image.

16 Claims, 8 Drawing Sheets

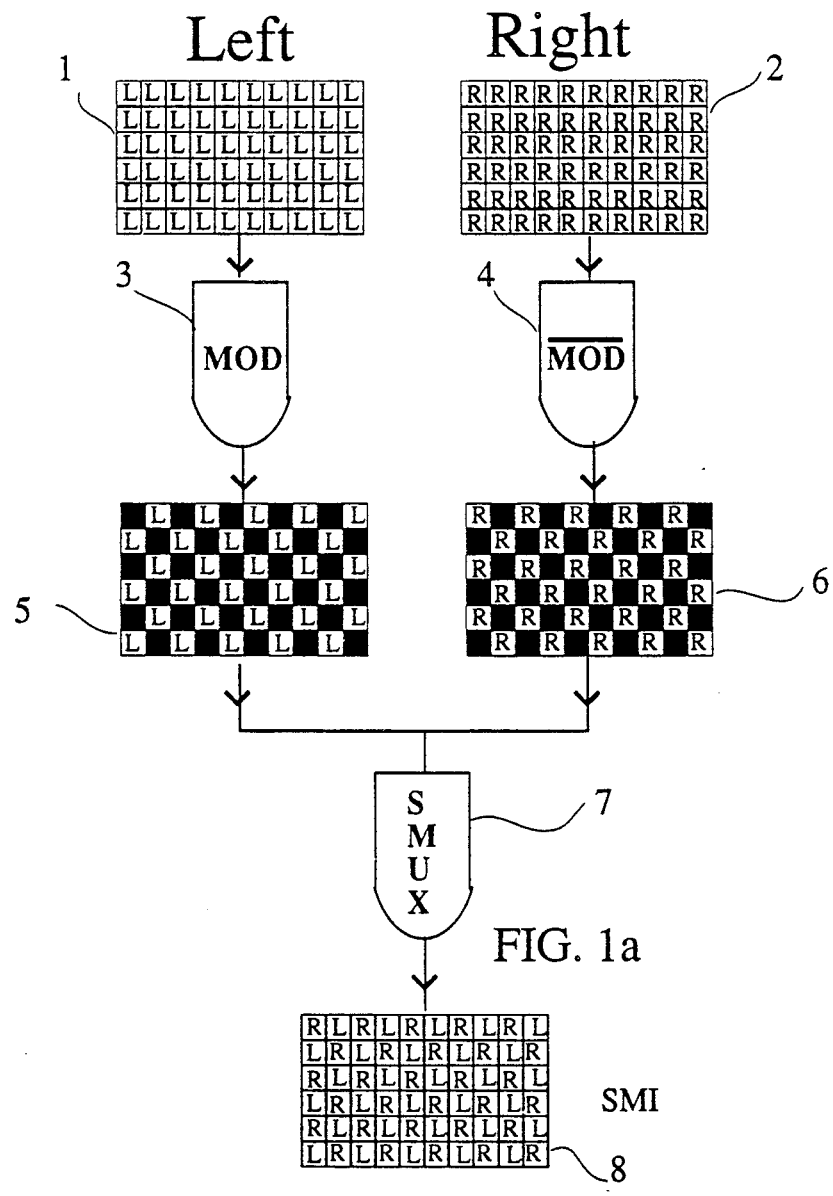
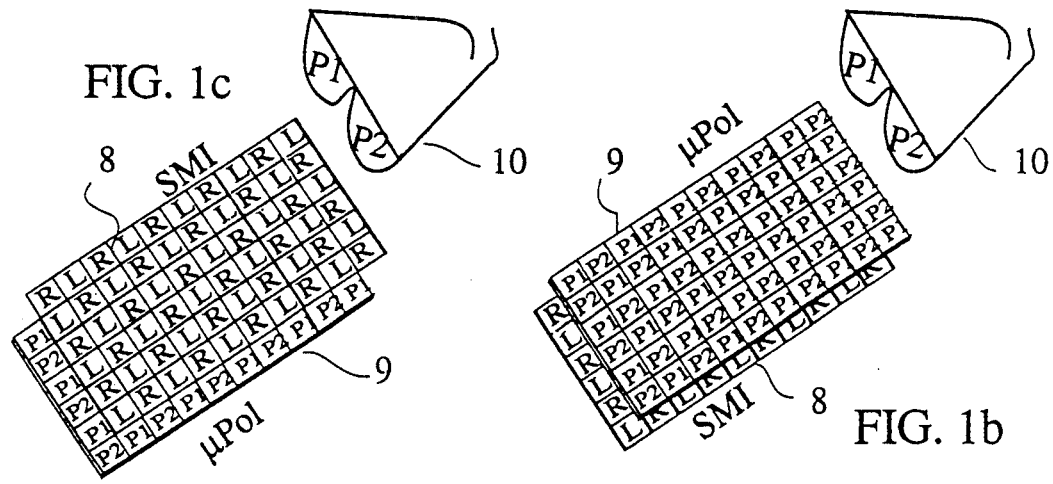

3-D STEREO COMPUTER OUTPUT PRINTER

BACKGROUND OF THE INVENTION

1. Field of the Invention

This invention relates to the field of computer hard copy output devices. In particular it deals with printers color and black and white, including laser printers, ink-jet printers, thermal printers and photographic printers. It also relates to the general field of 3-D stereo imaging and recording, and in particular, 3-D stereo computer hardcopy printers.

2. Description of Related Art

All living creatures are endowed with a pair of eyes for 3-D stereoscopic vision. They have depended on this vision for their survival. Yet, in spite of the tremendous advances in information technology, there is no prior art teaching how to obtain hardcopy outputs from computers in the form of 3-D stereo prints.

SUMMARY OF THE INVENTION

The principal object of the present invention is to provide computer hardcopy graphic printers which print 3-D stereo images. It comprises:

Means for electronically multiplexing spatially, the left and right images, printing them, and demultiplexing them with micropolarizers for viewing.

Means for aligning the micropolarizers to the spatially multiplexed image printer head and means for laminating the printed multiplexed image, the micropolarizer sheets and special polarizing preserving sheets which are coated with silver or aluminum flakes.

BRIEF DESCRIPTION OF THE DRAWINGS

FIG. 1a illustrates the principles behind the stereo printer, spatial modulation and spatial multiplexing of the left and right images.

FIGS. 1b and 1c illustrate the use of micropolarizer sheets for demultiplexing and stereo viewing of the printed image by means of polarized spectacles.

DETAILED DESCRIPTION OF THE PREFERRED EMBODIMENTS

Figure 7:
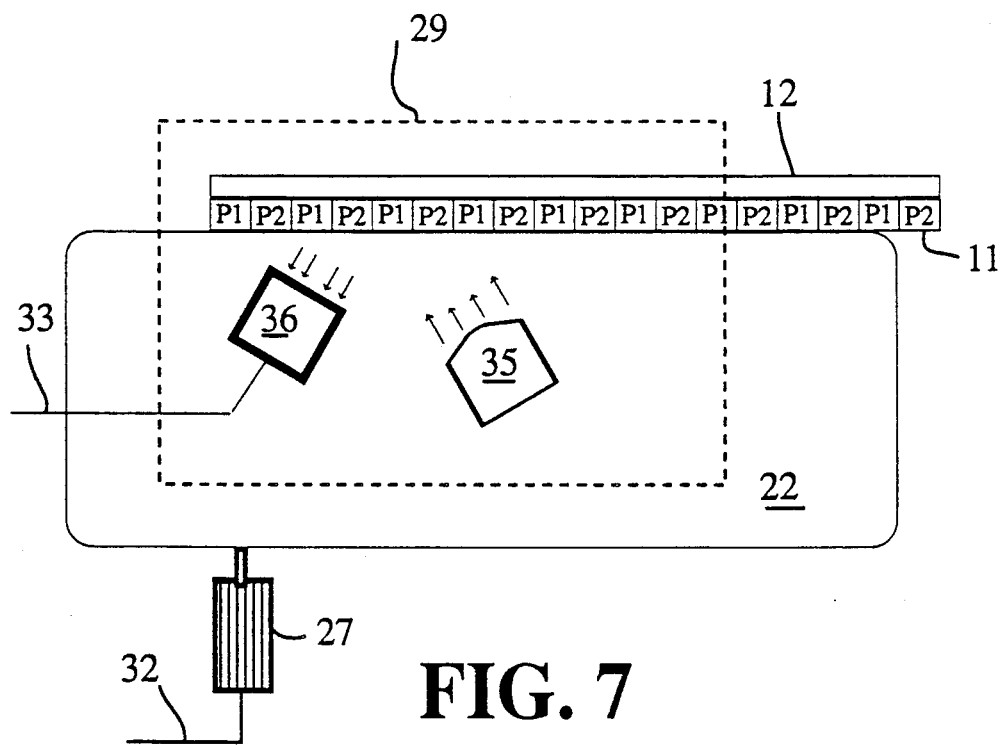
FIG. 7 illustrates another alignment means for use with embodiment of FIG. 6.

The invention is based on two fundamentally new concepts combined for the first time to record and display 3-D images. They are: Spatial Multiplexing of left and right images and Micro-Polarizers. These are described in my co-pending applications: "A System For Producing 3-D Stereo Images", Ser. Nos. 536,190, filed Jun. 11, 1990 and "Methods For Manufacturing Micropolarizers", Ser. No. 536,419, filed Jun. 11, 1990. FIG. 1a illustrates the spatial multiplexing principles. The data representing the left and right images are stored in a bit map format (other formats may also be used) in left memory array 1 (L-RAM), and right memory array 2 (R-RAM) respectively. Each pixel in the array has N-bits for color and gray-scale. Using a spatial checkerboard modulator MOD 3, the left image 1 is modulated and stored in the array 5. The right image is spatially modulated using the compliment of MOD 4 to produce the compliment pattern stored in array 6. The modulated images 5 and 6 are combined (multiplexed) using a spatial multiplexer 7 and the spatially multiplexed image (SMI) is stored in the array 8. The SMI 8 shows a combined left and right images side by side on a pixel by pixel basis and therefore caries of the stereo information. The flow diagram of FIG. 1a is an algorithm to produce the SMI which can be implemented either in hardware as described below in connection with FIGS. 7 and 8, or it can be implemented in software. In FIG. 1b the SMI 8 is combined with a spatial demultiplexer 9, a micropolarizer, $\mu$Pol sheet described in Application Ser. No. 536,190, and Ser. No. 536,419 and a polarization decoder 10, a pair of spectacles with polarization states P1 and P2. The SMI and the $\mu$Pol arrays which have the same period are aligned such that the left pixels in the SMI illuminate the P2 cells in the $\mu$Pol array and the right pixels illuminate the P1 cells. Thus, the left pixels become P2 polarized and the right pixels become P1 polarized. Because of the discriminating ability of the polarized eye glasses, the left eye which has a P2 polarizer can seen only the P2-polarized left pixels, and the right eye which has a P1 polarizer can see only the P1-polarized right pixels. To achieve the 3-D stereo sensation the human brain fuses the left and right images in the same manner it deals with natural 3-D scenes. FIG. 1c shows that the SMI 8 may also be placed top of the $\mu$Pol. Choosing between the configurations of FIG. 1b and FIG. 1c depends on how the SMI is illuminated, and whether the transmissive mode or reflective mode of display is used; see Ser. No. 536,190.

To build a hardcopy printer to output images from computers in stereo the above concept is used in conjunction with the principles taught in the embodiments described here. FIGS. 2a and 2b show how the final desired hardcopy stereo output is obtained. It comprises two sheets 11 and 12 laminated together to produce the output print 16. The first sheet 11 is a $\mu$Pol 9 on which the SMI 8 is printed after proper alignment is ensured. The second sheet 12 consists of regular paper 13, coated with aluminum or silver flakes 14 and a clear adhesive layer 15. The aluminum or silver layer is needed to preserve the polarization and maximize the brightness. If paper only was used in 13, the polarized light striking its surface becomes depolarized and as it emerges from the $\mu$Pol layer its brightness is reduced by at least 50%. FIG. 2c shows another simpler embodiment which eliminates the sheet 12 but achieves the same result by directly coating the back of the μPol 9 with a silver or aluminum film 14.

There are two classes of polarizer polymers; the absorptive class such as polyvinyl alcohol, PVA, and the reflective class such as cholesteric liquid crystal silicone, CLCS (see Robert Maurer et al, Society of Information Display SID 90 Digest, p. 110, 1990, and Martin Schadt, and Jurg Funischilling, SID 90 Digest, p. 324, 1990). The absorptive class converts unpolarized light to linearly polarized light of state P1 by absorbing the orthogonal state P2. This absorbed light energy is converted to heat and is lost for ever. The polyvinyl alcohol, PVA, used to construct the μPols in Ser. No. 536,190, and Ser. No. 536,419 belongs to the absorptive class. Hard copies based on the absorptive class, in general, lose at least 50% of the illuminating light. The reflective class separate the incident unpolarized light into two circularly polarized states P1 and P2, one state P1 is transmitted and the other state P2 is reflected. In this case no light energy is lost to heat and therefore it is possible to convert 100% of the incident light into polarized light with the desired state of polarization. This is done by coating a sheet of CLCS with a reflective metallic film on one side, and illuminating it on the other side with unpolarized light. 50% of this light is reflected as P1, and the other 50% is transmitted as P2. This P2. This P2 light is then reflected by the metallic layer and converted into P1 (it is well known in the field of optics that a circularly polarized light of one state is converted to the orthogonal state as a result of reflection), thus all the incident light converted to polarized light of state P1. This reflective class of polarizers when used to fabricate μPols, provides at least a factor of 2 brighter 3-D stereo prints than the absorptive class.

Figure 2:
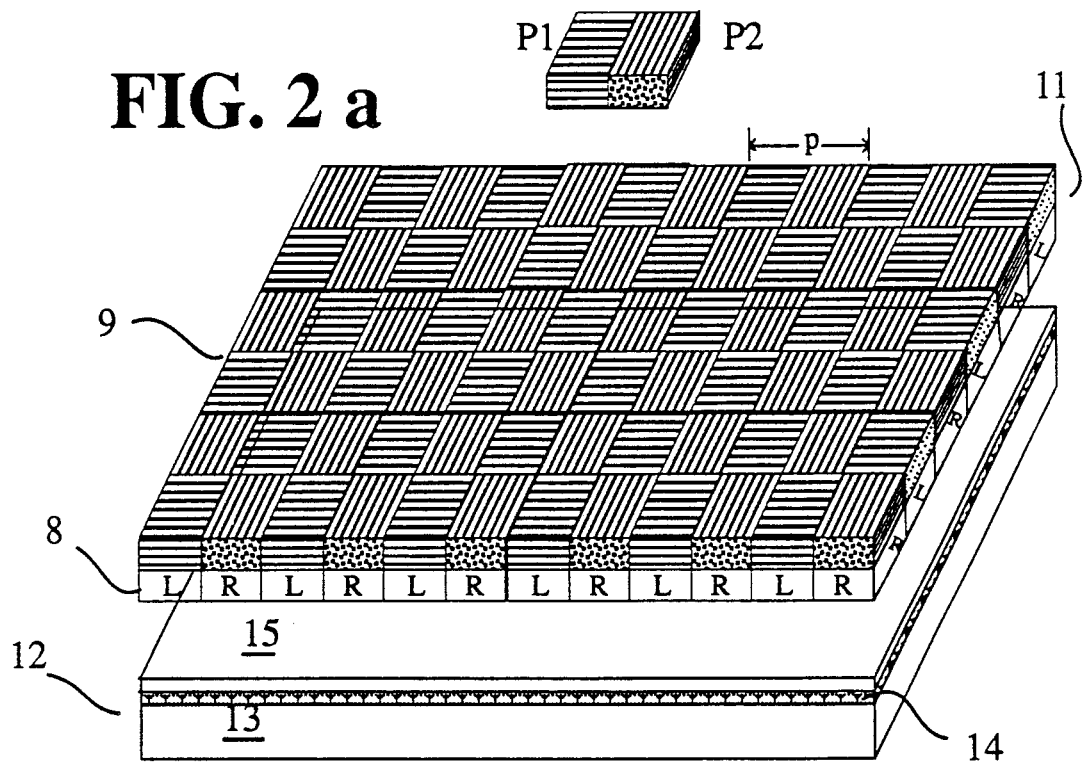
FIG. 2a-c show the 3-D stereo print made of laminating a printed micropolarize sheet with a polarization preserving aluminum coated paper.
Figure 2:
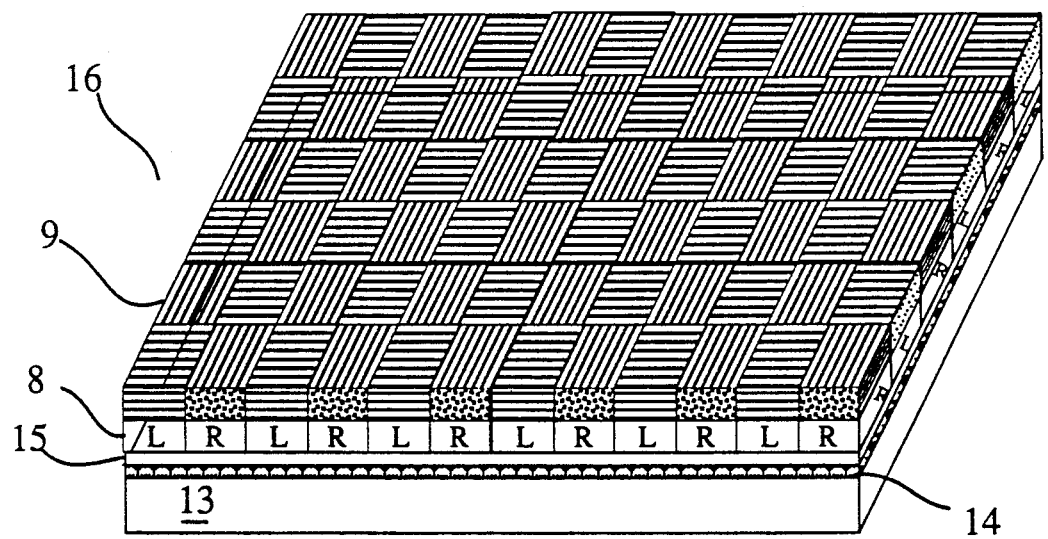
Figure 2:
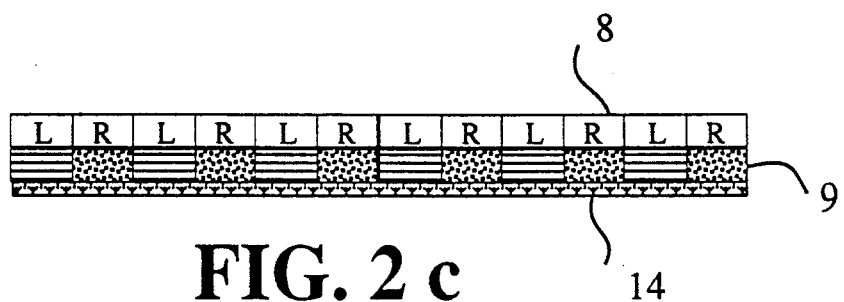
Figure 3:
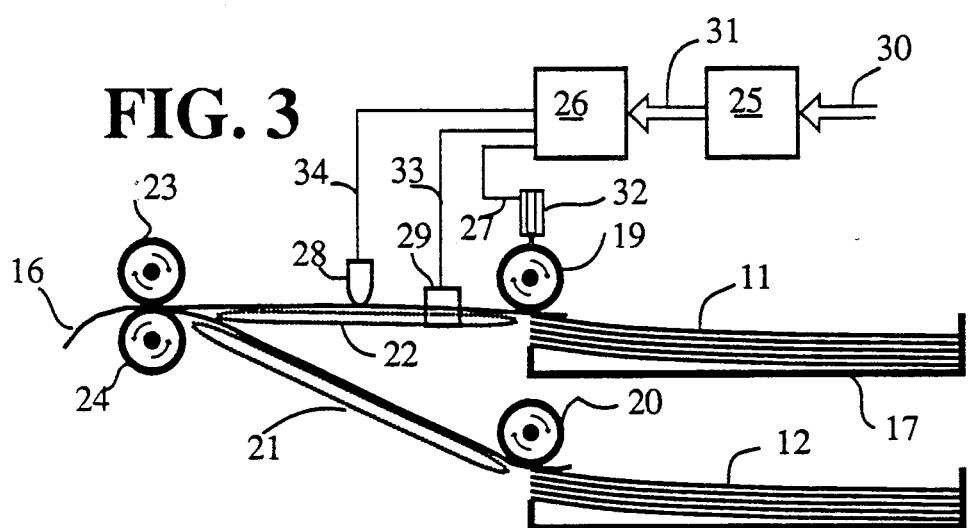
FIG. 3 shows the preferred embodiment of this invention, which is a complete 3-D stereo computer printing system.

FIG. 3 is the printing system which is capable of producing a 3-D stereo hard copy output 16(this laminated output is described in FIG. 2). It has 6 new elements which were not needed in conventional 2-D printers; These are: The SMI Generator 25; The μPol Sheets 11, The Silver Coated Paper 12, The Alignment Means 29; The X-Y-theta Motion Controller 27; and The Laminating Rollers 23, 24. The other elements are found in conventional 2-D printers. The system works as follows. The left and right images from the host computer are transferred to the SMI Generator 25 well known serial or parallel means through the interface bus 30. The SMI 8 produced according to the algorithm described in FIG. 1a is then transferred through bus 31 to the Printer Engine Electronics 26. This controls the electromechanical components, the paper handling, the print formatting, print head drivers, user interface, and other chores. When printing starts, a μPol sheet 11 is fed from tray 17 by means of a rubber surface cylindrical roller 19 which presses on the sheet while rotating to move the paper to the left. Alignment means 29 ensures that the sheet is properly aligned relative to the print head. The feed back signal 33 is produced by the alignment element 29 when the sheet is out of alignment with respect to the print head. When alignment is completed, the μPol sheet 11 is transported to the print head 28 which is controlled by the Printer Electronics 26 through control lines 34 and the SMI is printed. At the same time, a silver coated sheet 12 is also fed from tray 18 by means of roller 20. Both sheets are transported through their designated paths by a variety of known means 21,22 and these are appropriately synchronized to arrive simultaneously at the laminating rollers 23,24, to be laminated together and to produce the complete output print 16.

Figure 4:
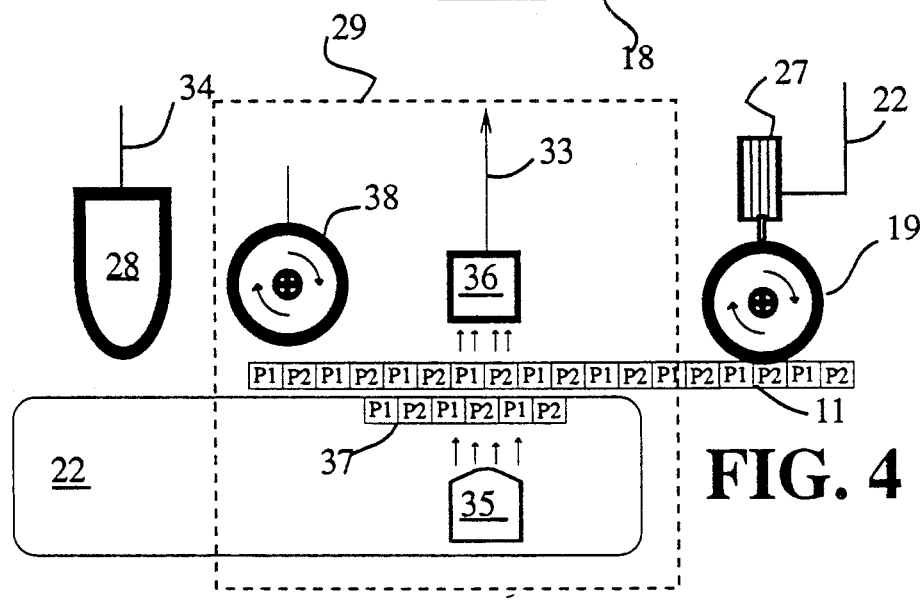
FIGS. 4 and 5 show detailed views of the means to align the micropolarizers to the print head.

The detailed of the alignment element 29 is shown in FIG. 4. It consists of the following components:

A small μPol array 37 having the same period as the stock μPol sheet 11. It is fixed to a platform 22. Its position is fixed relative to the print head. This serves as an absolute reference point, or the origin, x=0 and y=0 so that the 0,0 pixel of the SMI is always printed by the print head 28 at the same origin.

An LED 35 which illuminates both μPols 37 and 11.

A light detector 36 which detects the LED light transmitted through both μPols 37 and 11

A motion controller 29 which causes the roller 19 to have X, Y, and angular motion in response to signals from the Printer Electronics 26 through lines 32, and An auxiliary roller which is lowered to hold the μPol sheet 11 in position when complete alignment is achieved. It then transports it for printing while always maintaining alignment.

Figure 5:
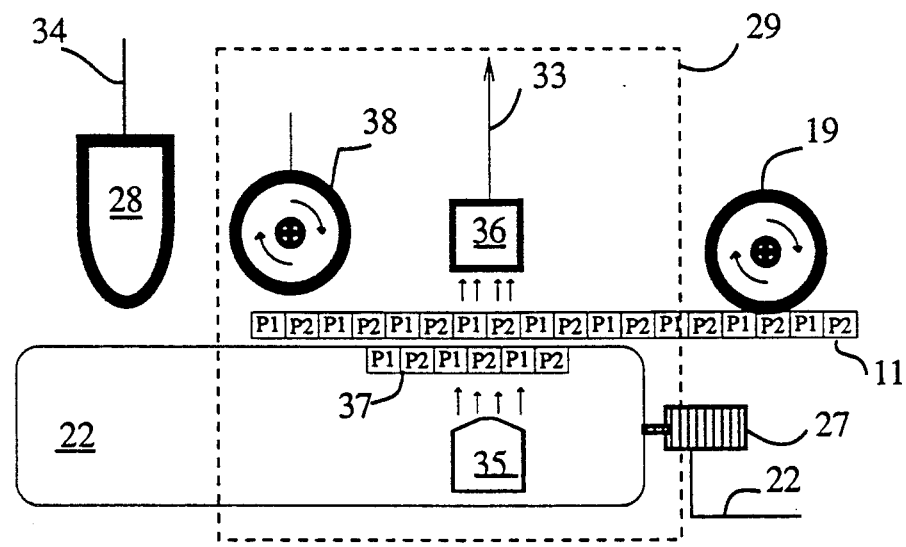

The alignment can be based either on maximizing the detected light or minimizing it. Maximum light is detected when P1 state of 37 is covered completely by P1 of 11, and P2 of 37 is covered by P2 of 11. Minimum light is detected when P1 is covered completely by P2. If one chooses to minimize the detected light for perfect alignment, x, and y error signals are fed back to the printer electronics to cause motion of the roller 19 in the X, Y and theta directions until the error signals vanish. When this happens, roller 38 takes over to hold down μPol 11 and feeds it to the left for printing. FIG. 5 shown another alignment embodiment. It is identical to the arrangement of FIG. 4 described above, except that instead of controlling the motion of the roller 19, the platform 22 is controlled.

Figure 6:
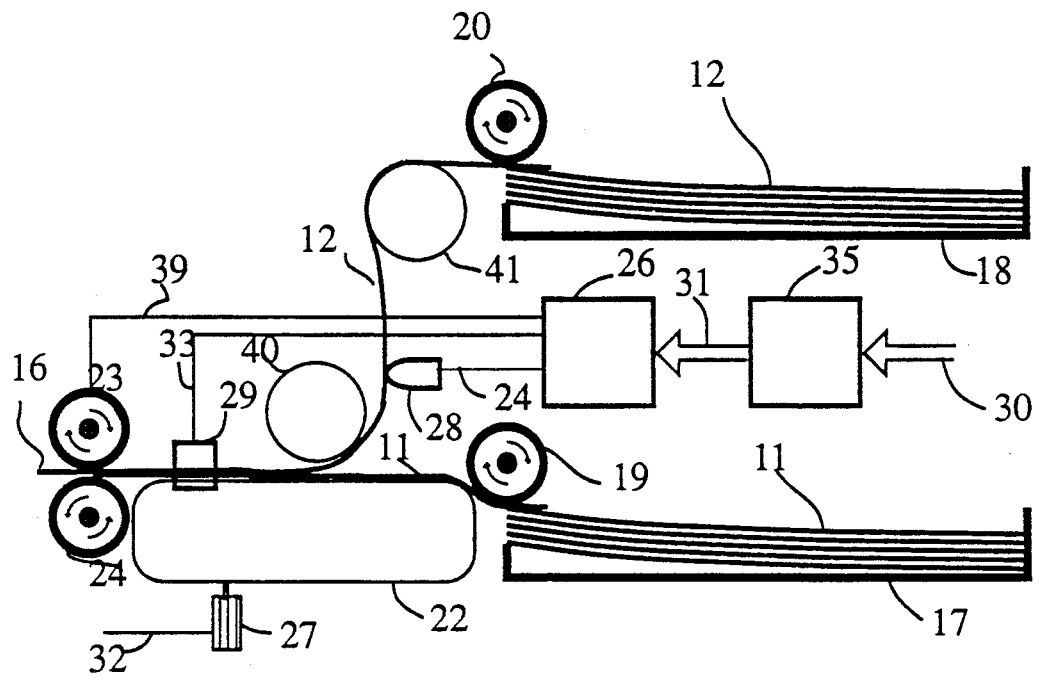
FIG. 6 shows another embodiment in which the printing is done on the aluminum coated sheet then laminated to the micropolarizer sheet.

Instead of printing directly on the μPol 1, it is possible to print the SMI into the silver coated sheets 12. This requires slight modification of the system described in FIG. 3 to that described in FIG. 6. The latter system has different paper handling parts 22, 40, 41, and the alignment is done after printing by means of a different device 29 shown in FIG. 7. It uses the reflective mode. A black an white checkerboard alignment pattern is printed on the sheet 12, such that the white squares are covered by P1 state of the μPol 11. The LED light is polarized with a state P2 so that when perfect alignment is achieved, the reflected light detected by the detector 36 is zero. The transmitted error signal 33 causes a signal 32 to control the X, Y and angular motion of the platform 22 holding μPol 11 until alignment is achieved. The final step is laminating 11 and 12 together by the laminating rollers 23, 24.

Figure 8:
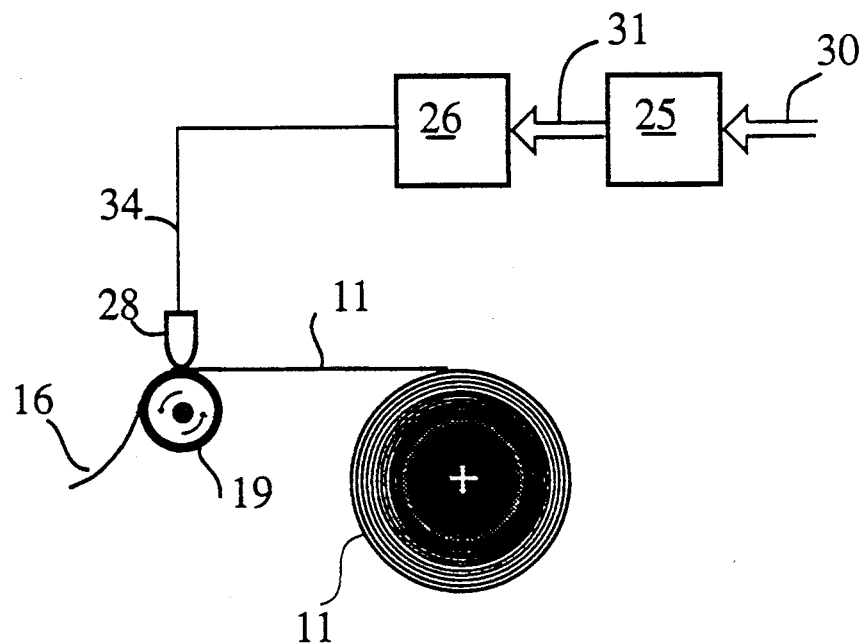
FIG. 8 illustrates a simplified 3-D printer with a self-alignment mechanism based on precision sprocket roller.
Figure 9:
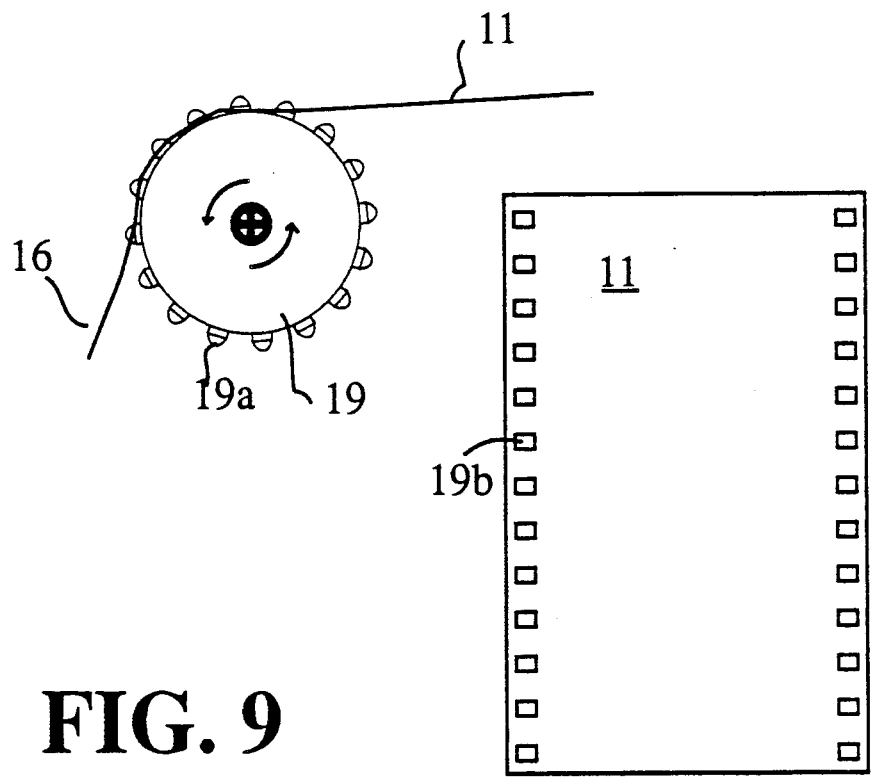
FIG. 9 shows a side view of the precision sprocket roller feeding the paper.

In another embodiment described in FIG. 8, a simplified self-aligned 3-D stereo printer is produced. It eliminates the alignment device 29, the laminating rollers 23,24, the tray 18. Instead, it uses a roll of stock μPol 11 coated from one side with a reflective film, and on the other side the SMI is printed to produce the final print 16 (see FIG. 2c). The self-alignment of the μPol relative to the print head is achieved by means of a precision sprocket roller 19 which feeds, transports and aligns the stock 11. As FIG. 9 shows, the stock 11 has rectangular holes 19b for the sprocket teeth 19a. The holes are precisely located relative to μPol array, and relative to the sprocket teeth. Printing starts at the origin which is a fixed point on the precision sprocket roller 19. This guarantees that SMI is aligned to the μPol.

Figure 10:
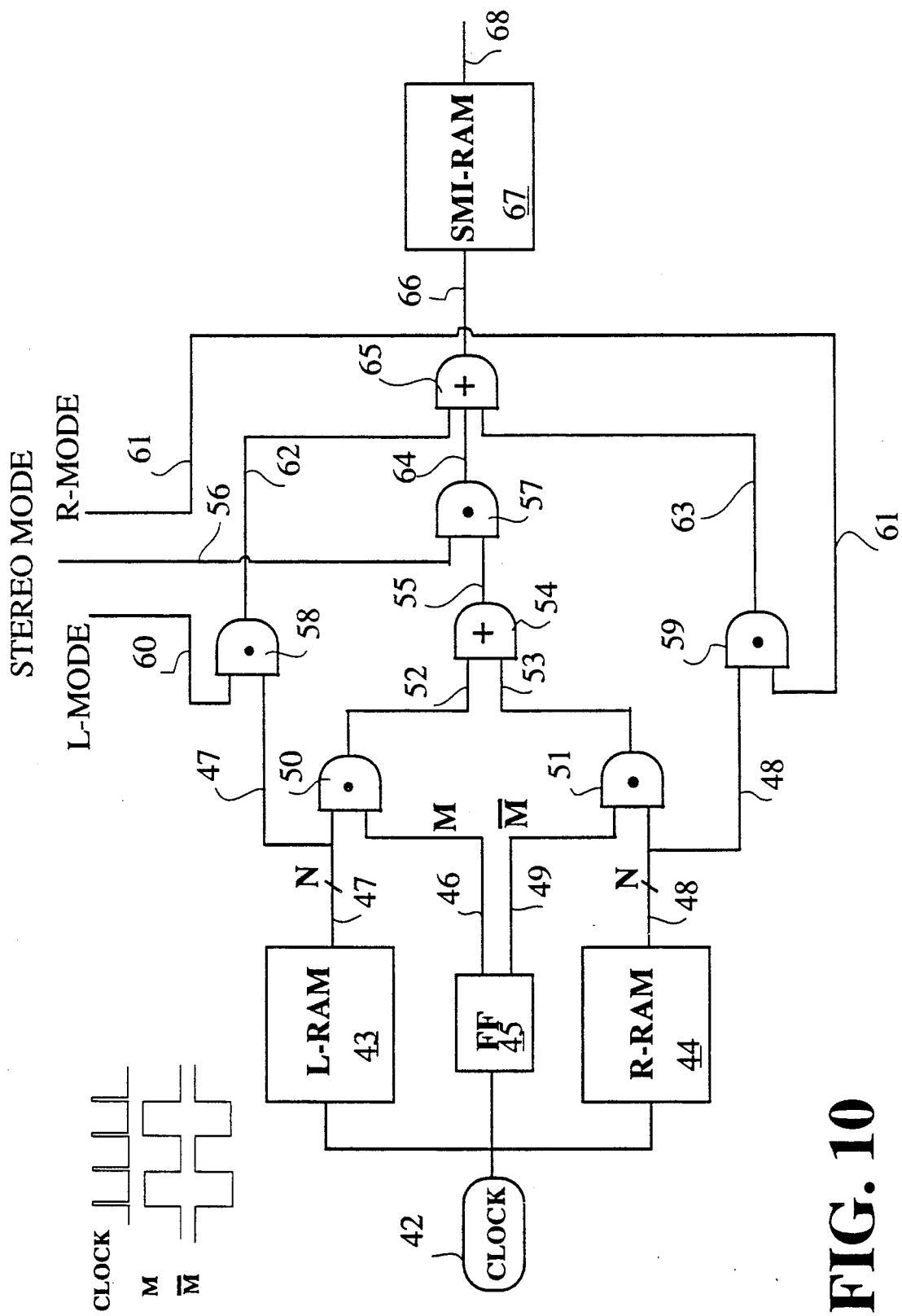
FIG. 10 and 11 illustrate electronic means for combining the left and right images.
Figure 11:
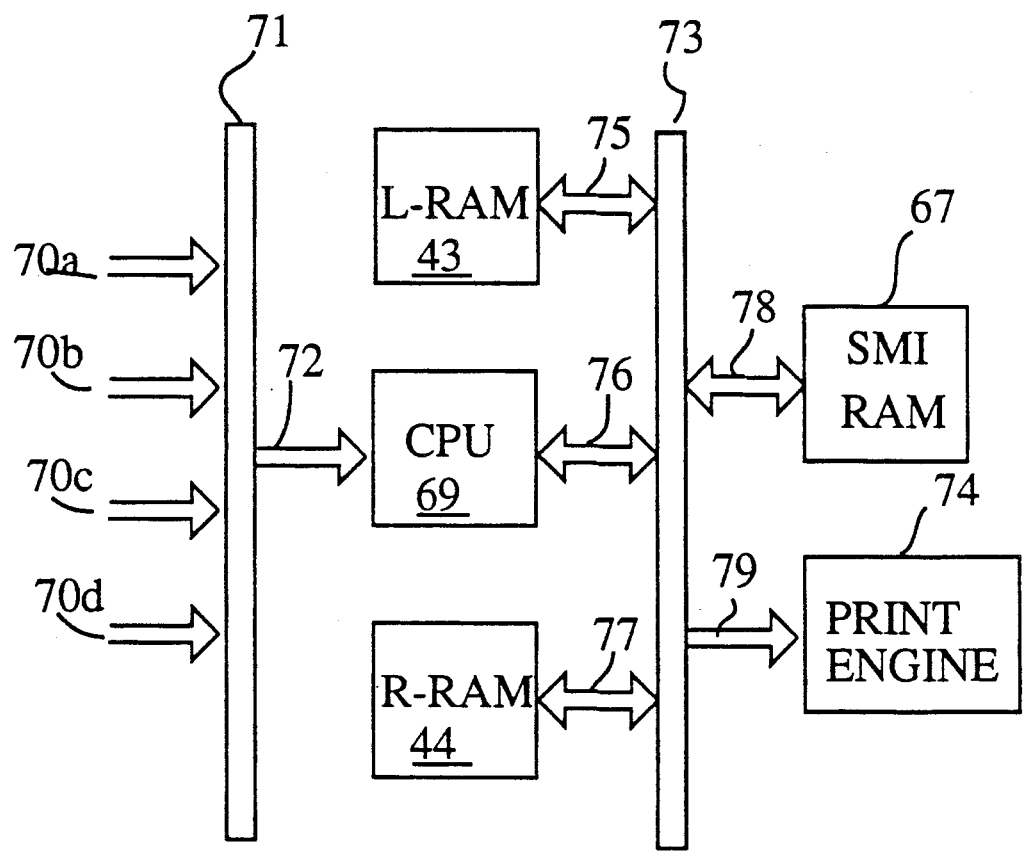

The SMI Generator general algorithm shown in FIG. 1a is implemented by means of two embodiments shown in FIGS. 10 and 11. In FIG. 10, the spatial modulation and spatial multiplexing are accomplished by means of a flip-flop 45, AND gates 50, 51, 57,58, 59, and OR gates 54, 65. Initially the left and right image data are loaded into L-RAM 43 and R-RAM 44 respectively. The SMI generation starts by reading simultaneously the L-RAM and R-RAM on a row by row basis starting with the first row. The operation is synchronized with the clock 42. The complementary outputs 46, 49 of the flip-flop 45 and the memory outputs 47, 48, drive respectively the AND gates 50 and 51 to produce the modulated outputs 52 and 53. These are combined with the OR gate 54 to produce the spatially multiplexed output 55. Note that each input and out put of the logic gates has N bits for each pixel. The modulation wave-forms 46, 49 are shown in the inset along with the clock pulses. The gates 57, 58, 59 add flexibility to the printer by giving the user a choice to select to print in stereo by making input 62 high, while inputs 60, and 61 low; or print left image only by making input 60 high while 56 and 61 low; or print right image only by putting 61 high, while keeping 60 and 56 low. The result of the selection 66 is stored in the SMI-RAM 67 whose output 68 is sent to the Printer Engine Electronics 25.

FIG. 11 is another SMI Generator embodiment which uses a microprocessor 69 to control the printer and co-ordinate printing for many users through interface buses 70 a-d which are connected to bus 71. The CPU 69 receives the image data through 72 and transfers it via buses 73, 75, 76 and 77 to L-RAM 43 and R-RAM 44. The microprocessor, subsequently, produces the SMI and stores it in SMI-RAM. The microprocessor is programmed to do this following the algorithm outlined in FIG. 1a. Then it transfers the SMI to the Print Engine 74 to complete printing.

The construction of the print head 28 can be based on one of five printing classes illustrated in FIG. 12. The ink ribbon class FIG. 12a is the most common. The ink is transferred from the ribbon 81 to the paper 11 by means of a print mechanism 80. This may be print hammers, print wire matrix, or thermal head which locally melts the ink and transfers it to the paper. The ink-jet class FIG. 12b transfers drops of ink through nozzles 82 to the paper 11. An ink reservoir 83 for each color is connected to the nozzles through 84. FIG. 12c is an electrostatic print head which transfers charge from the charger 85 directly to the paper. The amount of charge represents the image gray scale. Using a developer 93, this charge covered paper is then developed by attracting toner or ink.

Figure 12A:
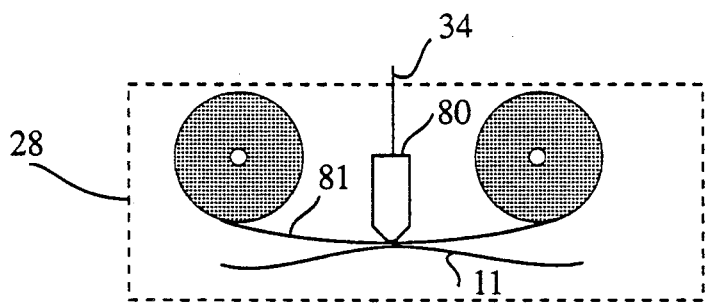
FIG. 12a-e show five classes of print heads which can be used with the preferred embodiments of FIGS. 3, 6, and 8.
Figure 12B:
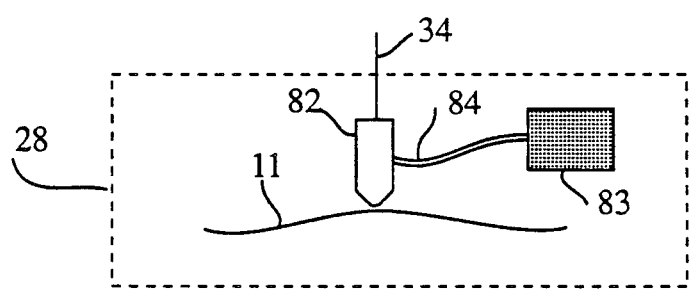
Figure 12C:
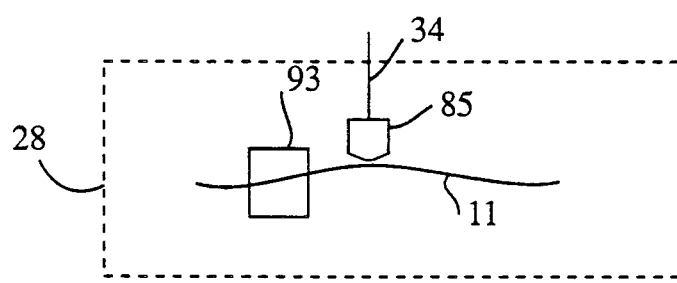
Figure 12D:
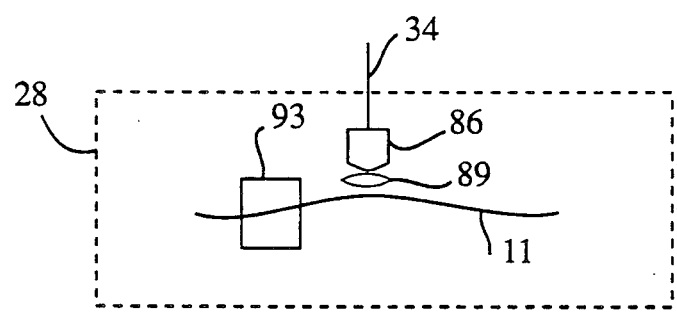
Figure 12E:
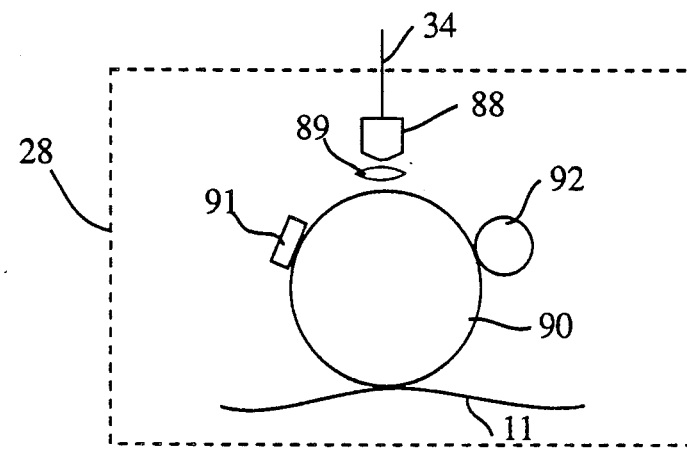

For high resolution color printers, the photographic class FIG. 12d is used. The paper 11 is covered with a photosensitive film which is then exposed through a lens 87 by means of an image generator such as a CRT or a light valve. The exposed paper is then developed by an appropriate developer 93. Finally, the class, also known as xerographic, is shown in FIG. 12e. A cylindrical drum 90 covered with photoconductive material is charged with a charger 91. A laser or light valve projects the image onto the charged surface through lens 89. The charges on the illuminated surface is conducted away, while the charge on the unilluminated surface remains. This latent charge image is developed by the toner 92. The toner consists of particles that are attracted by the charge and stick to the surface of the drum. The toner image is then transferred from the drum to the paper 11 and fused into it.

What is claimed is:

1. A printing system for producing 3-D stereo hard copy computer outputs of graphic images in response to applying the left and right perspectives of an imaged object to its input, comprising:
   a. a spatial multiplexing means for combining the left and right perspectives into a single spatially multiplexed image, SMI;
   b. printing medium comprising at least one component;
   c. means for printing the SMI on said printing medium;
   d. image aligning means;
   e. handling means for feeding, transporting, and combining components of printing medium and
   f. means for decoding and viewing 3-D stereo images.

2. A printing system for producing 3-D stereo hard copy computer outputs of graphic images according to claim 1, wherein the means for spatial multiplexing is based on the following algorithm: Two complementary spatial modulators modulate the left and right perspectives with a spatial code pattern and its complement respectively. These modulated perspectives are then combined into one spatially multiplexed image. Said algorithm is implemented by software, hardware, or optical means.

3. A printing system for producing 3-D stero hard copy computer outputs of graphic images according to claim 1, wherein the printing medium comprises a micro-polarizer array, $\mu$Pol, sheet component, and a polarization preserving reflective component. The two components are laminated together at the end of the printing process.

4. A printing system for producing 3-D stereo hard copy computer outputs of graphic images according to claim 3, wherein the $\mu$Pol sheet is based on the absorptive polarizing class that is made of polyvinyl alcohol, PVA.

5. A printing system for producing 3-D stereo hard copy computer outputs of graphic images according to claim 3, wherein the $\mu$Pol sheet is based on the reflective polarizing class that is made of cholesteric liquid crystal silicone, CLCS, polymer.

6. A printing system for producing 3-D stereo hard copy computer outputs of graphic images according to claim 1, wherein the printing means prints the SMI directly on the $\mu$Pol component of the printing medium.

7. A printing system for producing 3-D stereo hard copy computer outputs of graphic images according to claim 1, wherein the printing means prints the SMI directly on the reflective component of the printing medium.

8. A printing system for producing 3-D stereo hard copy computer outputs of graphic images according to claim 1, wherein image aligning means ensures that the printed pixels of the left perspective overlap one polarization state of the $\mu$Pol, while the right pixels overlap the other orthogonal polarization state of the $\mu$Pol.

9. A computer printing system for producing 3-D stereo hardcopy prints according to claim 1, wherein the image aligning means comprises:
   means for detecting misalignment and generating error signals;
   means for controlling the motion of the print medium; and feedback means for adjusting the position of the print medium.

10. A printing system for producing 3-D stereo hard copy computer outputs of graphic images according to claim 9, wherein the means for detecting misalignment comprises, a small micropolarizer array, a light generator, light detector, and the light emanating from the print medium.

11. A printing system for producing 3-D stereo hard copy computer outputs of graphic images according to claim 1, wherein the image aligning means comprises a precision sprocket roller and sprocket perforations precisely located on the print medium relative to the printing means.

12. A printing system for producing 3-D stereo hard copy computer outputs of graphic images according to claim 1, wherein the means for printing the SMI includes, photographic, electro-photographic, electrostatic, ink jet, and ink ribbon/impact head combination.

13. A printing system for producing 3-D stereo hard copy computer outputs of graphic images according to claim 1, wherein the printing medium is a micropolarizer array, $\mu$Pol, coated from one side with a photographic emulsion to be used with a high resolution photographic printing means.

14. A printing system for producing 3-D stereo hard copy computer outputs of graphic images according to claim 1, wherein the means for decoding and viewing the 3-D stereo image comprises the $\mu$Pol of the printing medium and a pair of polarized eye glasses.

15. A printing system for producing 3-D stereo hard copy computer outputs of graphic images according to claim 2, wherein the means for implementing the spatial multiplexing algorithm is an electronic circuit which enables the system to print the left mode only, right mode only, or the 3-D stereo mode. Said circuit comprises a clock generator, a RAM for each perspective, flip-flop, logic gates, RAM for the SMI, and logic means for selecting the left-mode, right-mode, or stereo mode.

16. A computer printing system for producing 3-D stereo hardcopy prints according to claim 2, wherein the means for combining image perspectives comprises multiple user interface buses, RAM for each perspective, a microprocessor, buses, SMI RAM, and a program to generate the modulation and multiplexing functions.

* * * * *